(12) United States Patent
Oka et al.

(10) Patent No.: US 6,258,465 B1
(45) Date of Patent: Jul. 10, 2001

(54) ENERGY ABSORBING MEMBER

(75) Inventors: Takashi Oka; Hiroyuki Yamashita; Masakazu Hirano, all of Shimonoseki (JP)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 0 days.

(21) Appl. No.: 09/111,792

(22) Filed: Jul. 8, 1998

(30) Foreign Application Priority Data

Jul. 9, 1997 (JP) .................................................. 9-200793
Aug. 5, 1997 (JP) .................................................. 9-224236

(51) Int. Cl.⁷ .............................. C22C 21/08; C22C 21/16
(52) U.S. Cl. ......................... 428/599; 428/598; 428/595; 428/586; 420/535; 420/544; 420/552; 72/711; 72/700; 148/690; 148/702
(58) Field of Search .................................... 148/417, 416, 148/415, 405, 689, 690, 702; 428/586, 598, 599, 595; 188/233.7; 296/188, 189; 138/177, 172; 72/711, 700; 420/544, 535, 552

(56) References Cited

U.S. PATENT DOCUMENTS 4,826,238 * 5/1989 Misono et al. .
5,571,347 * 11/1996 Bergsma .
5,700,424 * 12/1997 Matsuo .
5,996,645 * 12/1999 Hosokawa et al. .

FOREIGN PATENT DOCUMENTS

| | | |
|---|---|---|
| 5-025595 | 2/1993 | (JP) . |
| 5-247575 | 9/1993 | (JP) . |
| 6-25783 | 2/1994 | (JP) . |
| 6-247338 * | 9/1994 | (JP) . |
| 7-118782 | 5/1995 | (JP) . |
| 7-35252 | 6/1995 | (JP) . |
| 7-310156 | 11/1995 | (JP) . |
| 8-216917 | 8/1996 | (JP) . |
| 8-310440 | 11/1996 | (JP) . |

* cited by examiner

Primary Examiner—Deborah Jones
Assistant Examiner—Wendy Boss
(74) Attorney, Agent, or Firm—Oblon, Spivak, McClelland, Maier & Neustadt, P.C.

(57) ABSTRACT

Provided is an energy absorbing member which makes it possible to induce contraction and deformation into a form of bellows, with Euler's buckle being restrained. An energy absorbing member comprises a hollow extrusion which is made of an aluminum alloy and has an outer portion and an inner rib connected to the outer portion, and the radius of the corner where the rib and the outer portion are connected to each other is not more than a half of the thickness of the rib. A similar energy absorbing member has plural inner ribs which are connected to the outer portion and cross each other, and the radius of the corner where the ribs cross each other is 1 mm or less.

20 Claims, 6 Drawing Sheets

ENERGY ABSORBING MEMBER

BACKGROUND OF THE INVENTION

1. Field of the Invention:

The present invention relates to an energy absorbing member comprising an extrusion made of an aluminum alloy, and having a function that in receiving a compressive impact load or a compressive static load in the extruding axial direction the impact load or the static load can be absorbed.

2. Related Arts:

Recently, the global environment has bee regarded as being of worldwide importance. For example, regulations for reducing gas emissions including carbon dioxide and exhaust gas from automobiles have been strengthened in may countries in order to suppress global warming. Accordingly, lightweight automobiles have been rapidly developed.

Thus, investigations have been made on application of an extrusion made of an aluminum alloy to frames of an automobile and the like.

Into an automobile, incorporated are various energy absorbing members for relieving an impact caused when the automobile collides or contacts another automobile or an object. Recently, attempts have been made to relieve impacts provided to persons in an automobile by using structural members such as a side frame and a bumper stay as an energy absorbing member for absorbing impacts in collision and crushing the member into a form of bellows.

One requirement for such an energy absorbing member is that when a load is applied to the member in the extruding axial direction, in the whole of the member an Euler's buckle (the buckle that the whole of an object is bent into an "L"-like shape) and squeezing cracks (or pressing cracks) do not break out but the member is contracted and deformed into a form of bellows so as to absorb the impact energy stably. When a squeezing crack breaks out, for example, in a side frame of an automobile, contraction and deformation into a form of bellows are disturbed so that energy may not be absorbed stably. Furthermore, broken pieces are scattered in a small engine room and a tip of the pieces is projected out to damage other parts and wirings or penetrate through an outer plate of the car body. Thus, such a material cannot be regarded as a reliable material.

Hitherto, various investigations have been made on development of members having a stable energy absorbability. For example, Japanese Patent Laid-Open (JP-A-) No. 6-247338 discloses a technique of intentionally making different between the sectional secondary moment (rigidity) around the X axis and that around the Y axis in the cross section of a side member comprising a hollow member having a rectangular section, in order to cause the hollow member to be contacted and deformed into a form of bellows, with Euler's buckle being restrained; and setting the section shape of the panel, in the side member, which may be probably buckled into a form of bellows into such a shape that after collision of the panel, the panel will be buckled previously to buckles of other panels. This publication states that once any one of panels is buckled, the buckle into a form of bellows is transmitted to other panels in succession, and that even if the whole of the side member is long, the buckle into a form of bellows occurs stably over the whole length. Besides, JP-A-6-25783, JP-A-7-118782, JP-A-7-310156, JP-A-8-216917, JP-A-8-310440 and others disclose a technique for improving energy absorbability by investigating and adjusting the composition of an aluminum alloy for use as an energy absorbing member, and its structure.

SUMMARY OF THE INVENTION

The first object of the present invention is to provide an energy absorbing member, for a side frame of an automobile or the like to which compressive load in its axial direction is applied, in which a sectional shape thereof is invented so as to induce contraction and deformation into a form of bellows, with Euler's buckle being restrained, and to attain stable energy absorption with large effective displacement and absorbed energy.

The second object of the present invention is to provide an energy absorbing member making best use of the strength and energy absorbability of 6000 series aluminum alloy (Al—Mg—Si alloy) extrusion itself, which has a relatively excellent resistance to corrosion, among high strength aluminum alloys, and is more advantageous from the viewpoint of recycling than other series aluminum alloys.

About the section shape of a hollow extrusion having an outer portion and an inner rib connected to the outer portion, the inventors have considered the sectional shape of the outer portion and that of the rib separately and consequently have found that the liability that Euler's buckle or deformation into a form of bellows breaks out is related to the rigidity of the portion where the plate constituting the outer portion is connected to the plate constituting the rib, that of the portion where the inner ribs cross each other, and that of the inner rib(s); and that when the rigidity of these portions is small, buckles are liable to break out in the plates constituting the outer portion and the rib(s) so as to easily induce deformation into a form of bellows. The present invention based on these findings has at least one characteristic of the following (1) and (2).

(1) An energy absorbing member comprises a hollow extrusion which is made of an aluminum alloy and has an outer portion and an inner rib connected to the outer portion, and the radius of the corner where the rib and the outer portion are connected to each other is not more than a half of the thickness of the rib.

(2) An energy absorbing member comprises a hollow extrusion which is made of an aluminum alloy and has an outer portion and plural inner ribs which are connected to the outer portion and cross each other, and the radius of the corner where the ribs cross each other is 1 mm or less.

Satisfying these characteristics simultaneously is very useful.

Besides satisfying the aforementioned shape, the aluminum alloy constituting the energy absorbing member may be a heat treated aluminum alloy subjected to averaging treatment, so that resistance to squeezing cracks is more efficiently improved. A criterion for an appropriate degree of overaging treatment is as follows. Namely, when σ max represents the maximum value of the proof stress (σ 0.2) obtained by aging-treating an extrusion subjected to quenching treatment involving heating at not less than solution treating temperature and subsequent quenching, or press quenching treatment involving the steps of quenching by rapid cooling on line using temperature for hot processing, it is preferred that the member according to the invention is subjected to overaging treatment so that the proof stress thereof is 0.5 to 0.9 times the σ max. The condition for obtaining the energy absorbing member having this proof stress in the overaging treatment may be as follows: from 210 to 230° C.×from 150 to 240 minutes. The heat treated aluminum alloy subjected to the overaging treatment is preferably an Al—Mg—Si alloy, and more preferably comprises 0.35 to 1.6% by weight of Mg, and 0.2 to 1.6% by weight of Si, or comprises 0.35 to 1.1% by weight of Mg, 0.5 to 1.3% by weight of Si, 0.15 to 0.7% by weight of Cu, 0.005 to 0.2% by weight of Ti, and 0.06 to 0.2% by weight of Zr; at least one element selected from the group consisting of 0.05 to 0.5% by weight of Mn and 0.05 to 0.15% by weight of Cr; and the balance being Al and inevitable impurities. Besides satisfying the aforementioned composition, it is recommendable to contain 0.3% or less by weight of Fe.

The inventors have also found that in the case wherein an energy absorbing member is made of an aluminum alloy extrusion which is subjected to overaging treatment and comprises such a specific composition as above, that is, 0.35 to 1.1% by weight of Mg, 0.5 to 1.3% by weight of Si, 0.15 to 0.7% by weight of Cu, 0.005 to 0.2% by weight of Ti, and 0.06 to 0.2% by weight of Zr; at least one element selected from the group consisting of 0.05 to 0.5% by weight of Mn and 0.05 to 0.15% by weight of Cr; and the balance being Al and inevitable impurities, larger resistance to squeezing cracks can be obtained than the resistance according to the prior art even if the aforementioned shape is not used. Besides satisfying the aforementioned composition, it is preferred to contain 0.3% or less by weight of Fe, in the same manner as above. A criterion for an appropriate degree of overaging treatment is the same as described above. That is, preferably the member according to the invention is subjected to overaging treatment so that the proof stress thereof will be 0.5 to 0.9 times the maximum value σ max of the proof stress (σ 0.2) obtained by aging-treating the extrusion subjected to solution quenching or press quenching.

JP-A-6-247338, JP-A-7-310156, JP-A-8-216917, and JP-A-8-310440 relate to a structure of an energy absorbing member, but they are not techniques wherein energy absorbability is tied to the relationship between the radius of the corner where the outer portion is connected to the rib and the thickness of the rib nor techniques wherein energy absorbability is tied to the radius of the corner where the ribs cross each other. JP-A-6-25783 discloses improvement of energy absorbability, paying attention to the texture of an Al—Mg—Si alloy having a specific composition, specifically the particle size of crystals and the aspect ratio of the crystal particles, but not paying attention to overaging treatment as in the present invention. Furthermore, this publication never discloses the characteristics of the present invention, that is, optimization of the proof stress of the aluminum alloy subjected to overaging treatment on the basis of correlation between this proof stress and the maximum value of the proof stress obtained by aging treatment, for the purpose of obtaining excellent energy absorbability. JP-A-7-118782 states that energy absorbability is made appropriate on the basis of relationship between the breaking elongation of an aluminum alloy extrusion and the local elongation thereof. However, this publication does not pay attention to overaging treatment as in the present invention, and never discloses the characteristics of the present invention, that is, optimization of the proof stress of the aluminum alloy subjected to overaging treatment on the basis of correlation between this proof stress and the maximum value of the proof stress obtained by aging treatment, for the purpose of obtaining excellent energy absorbability. JP-A-5-25595 describes overaging treatment of an Al—Mg—Si alloy and proof stress after overaging treatment, but relates to a member subjected to bending process, not to any energy absorbing members. The Al—Mg—Si alloys disclosed in this publication are JIS 6063, JIS 6N01 and JIS 6061 alloys, and are different in the Zr content from the aluminum alloy comprising 0.35 to 1.1% by weight of Mg, 0.5 to 1.3% by weight of Si, 0.15 to 0.7% by weight of Cu, 0.005 to 0.2% by weight of Ti, and 0.06 to 0.2% by weight of Zr; at least one element selected from the group consisting of 0.05 to 0.5% by weight of Mn and 0.05 to 0.15% by weight of Cr; and the balance being Al and inevitable impurities, which exhibits excellent energy absorbaility regardless of the aforementioned structure.

DETAILED DESCRIPTION OF THE PREFERRED EMBODIMENTS

The following will describe the first embodiment according to the present invention, referring to the attached drawings. Firstly, using an extrusion having a representative sectional shape according to the invention in FIGS. 1A and 1B, names of respective portions and respective measurements of the portions will be explained. Of course, the hollow extrusion according to the invention is not limited to one having such a specified sectional shape as above.

Figure 1A:
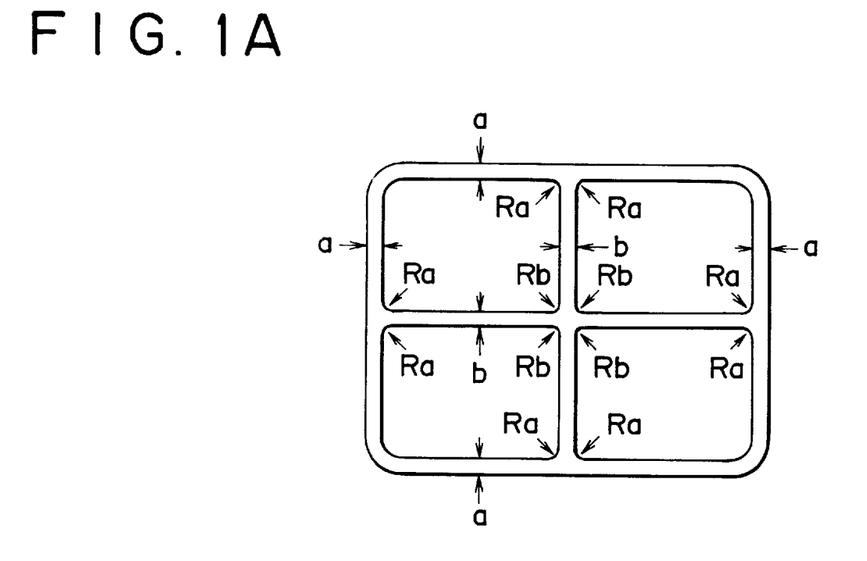
FIG. 1 is a view for explaining a sectional shape of a hollow extrusion according to the present invention.
Figure 1B:
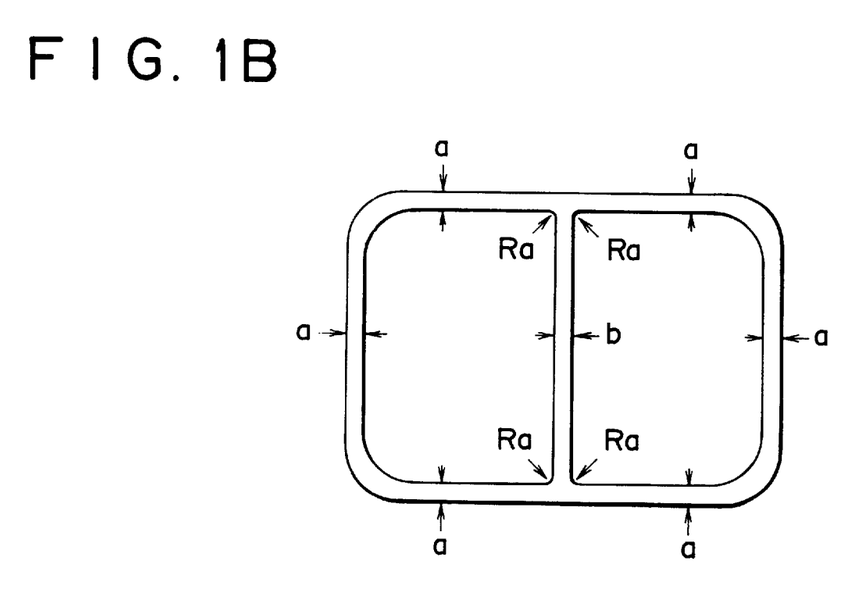

The extrusion shown in FIGS. 1A and 1B has a rectangular outer portion having an essentially uniform thickness a in cross sections, and ribs having an essentially uniform thickness b. The word "essentially uniform thickness" means that in each of the outer portion and ribs the thickness of any portions other than the connected portions, the cross portions and the corners thereof is the same.

The radius of the corner at the position where the outer portion and the rib are connected to each other, and the radius of the corner at the position where the ribs are connected to each other are referred to as "Ra" and "Rb", respectively.

Figure 2A:
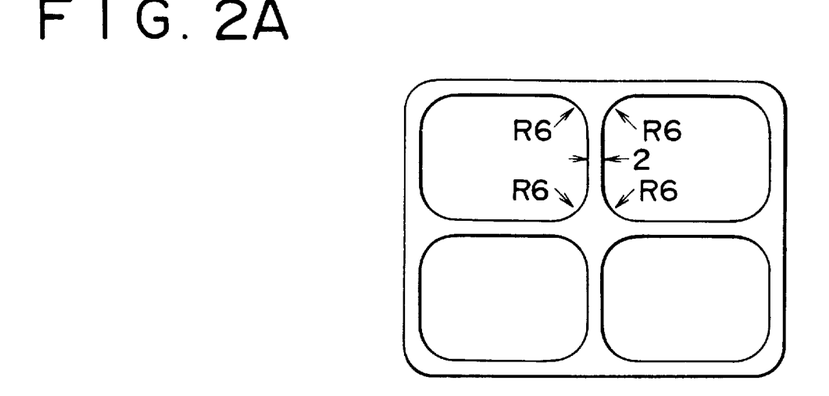
FIG. 2 illustrates sectional shapes of hollow extrusions in Comparative Example A, and Examples B and C.
Figure 2B:
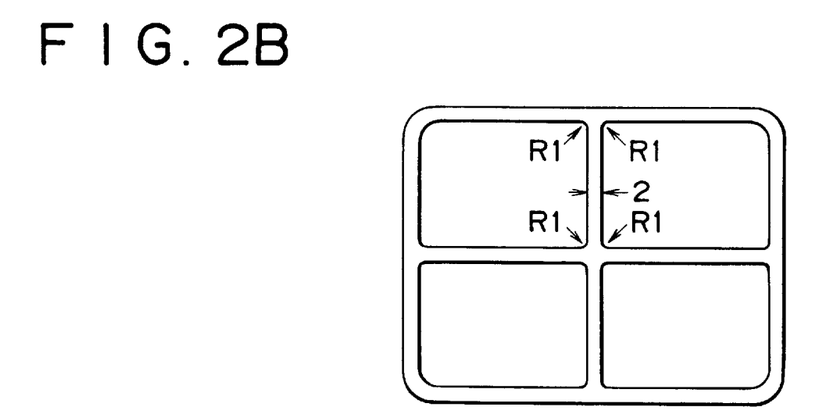
Figure 2C:
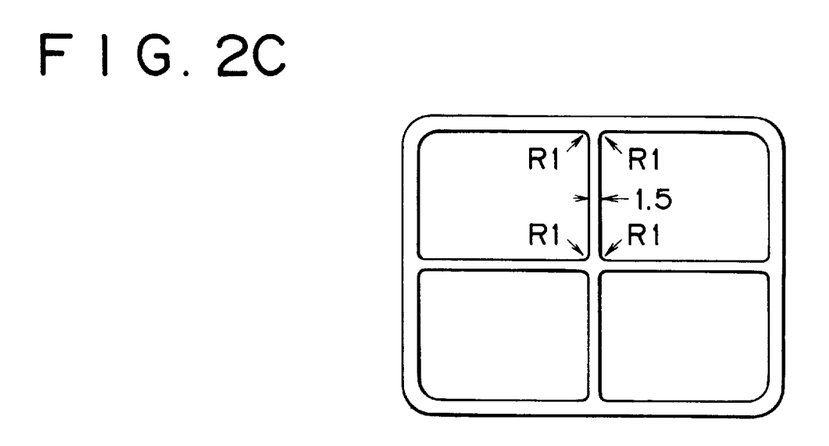

FIGS. 2A, 2B and 2C illustrate cross sections of three sorts of aluminum extrusions. (Hereinafter, the extrusions illustrated in FIGS. 2A, 2B and 2C are referred to as the extrusion A, the extrusion B and the extrusion C.) Each of the extrusions A, B and C is a hollow extrusion made of 6063-T5 aluminum alloy having the total length of 200 mm, and the extrusions A, B and C have the outer portion of the same shape. Its outer size is 45 mm×55 mm, and its thickness is 2 mm. In the extrusion A, all the corners Ra and Rb have radii 6 mm, respectively, the thickness b of the ribs is 2 mm. In the extrusion B, all the corners Ra and Rb have radii of 1 mm, respectively, the thickness b of the ribs is 2 mm. In the extrusion C, all the corners Ra and Rb have radii of 1 mm, respectively, the thickness b of the ribs is 1.5 mm.

Figure 7:
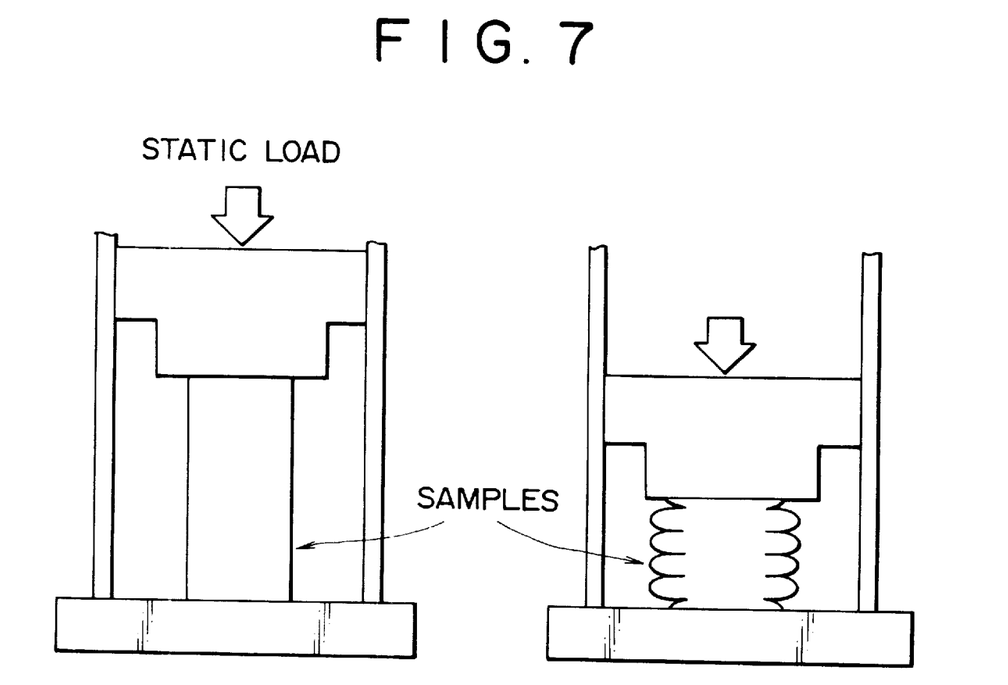
FIG. 7 is a view for explaining a static crush test in Examples.

As shown in FIG. 7, in Amsler testing machine a static compressive load was applied to each of the extrusions A, B and C, in the axial direction of the extrusion at a displacement speed of from several mm/minute to several tens mm/minute, so as to investigate the relationship between the load and the displacement.

Figure 3:
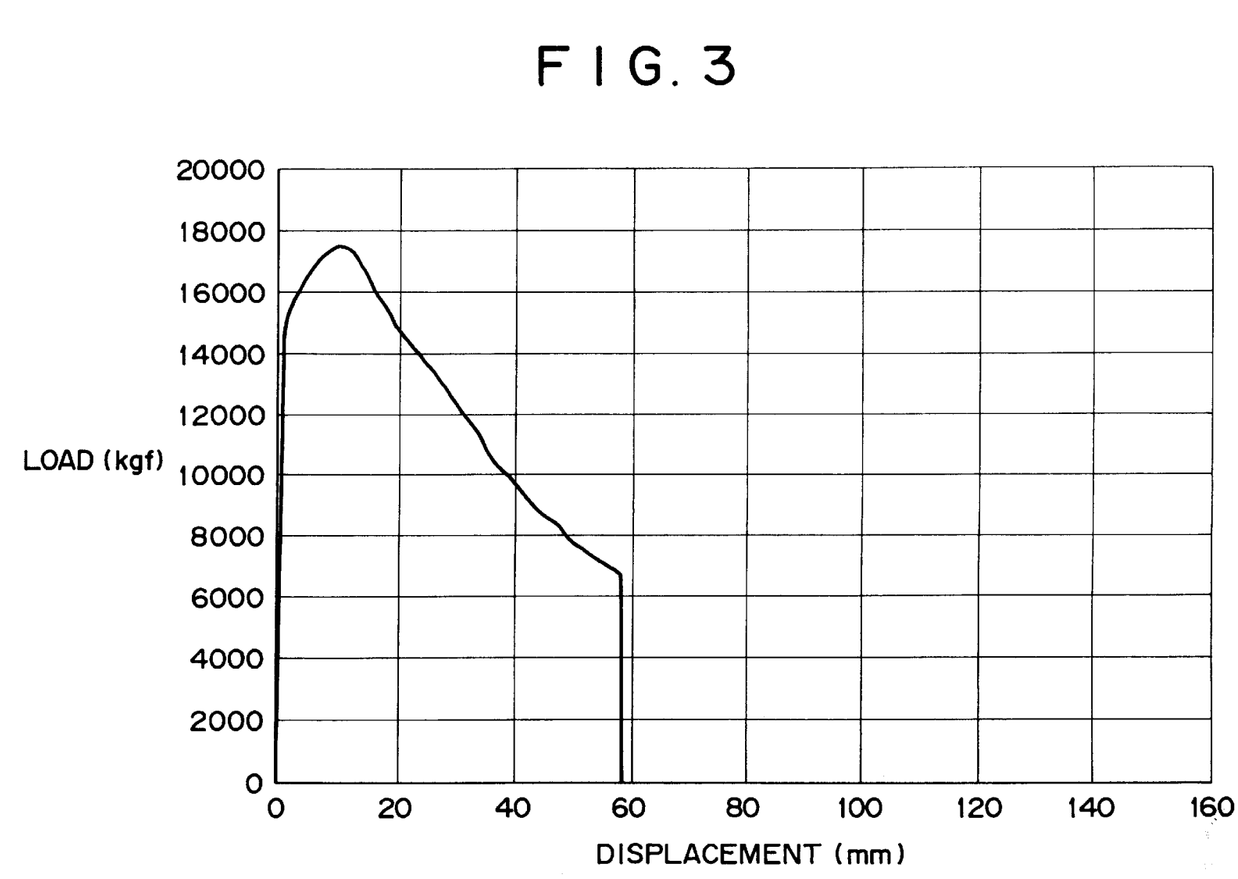
FIG. 3 shows a load-displacement curve of Comparative Example A.
Figure 4:
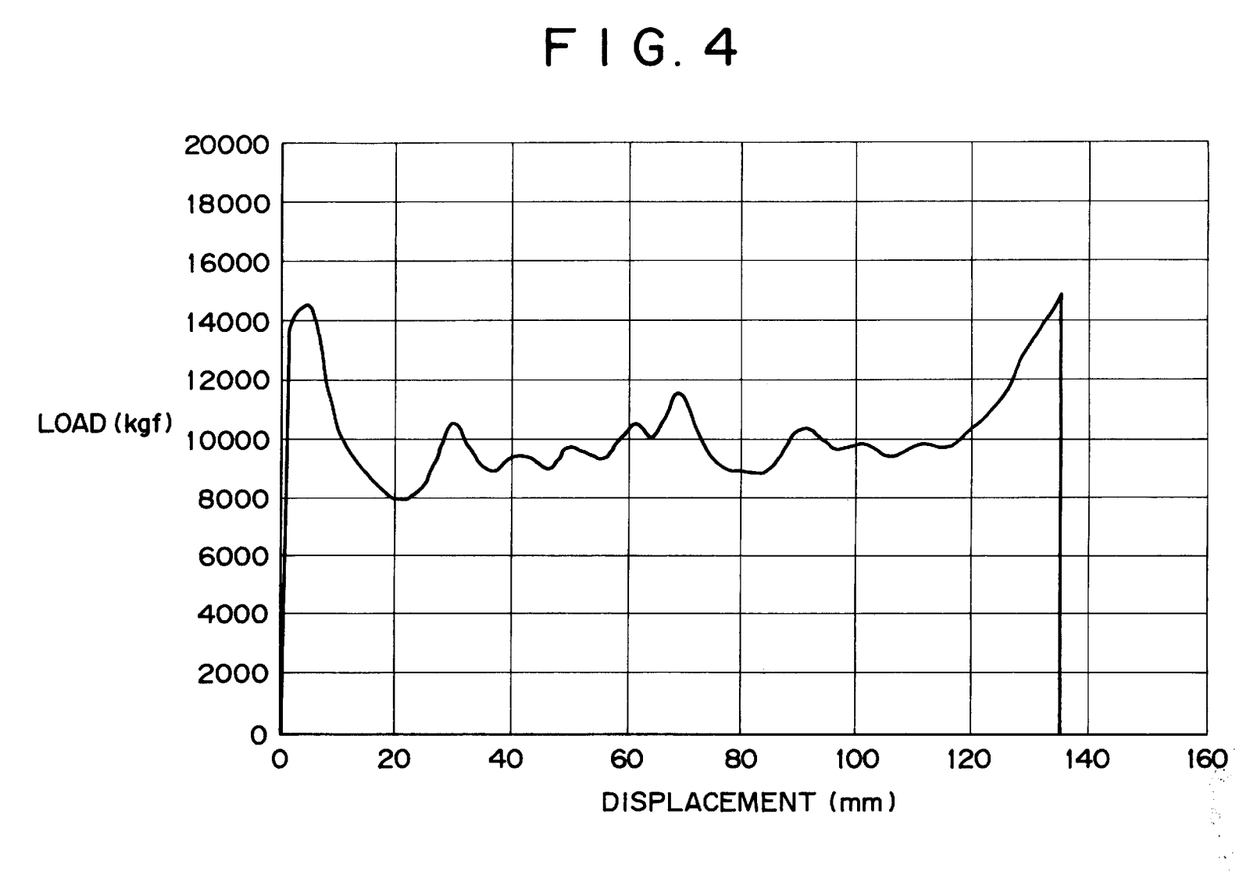
FIG. 4 shows a load-displacement curve of Example B.
Figure 5:
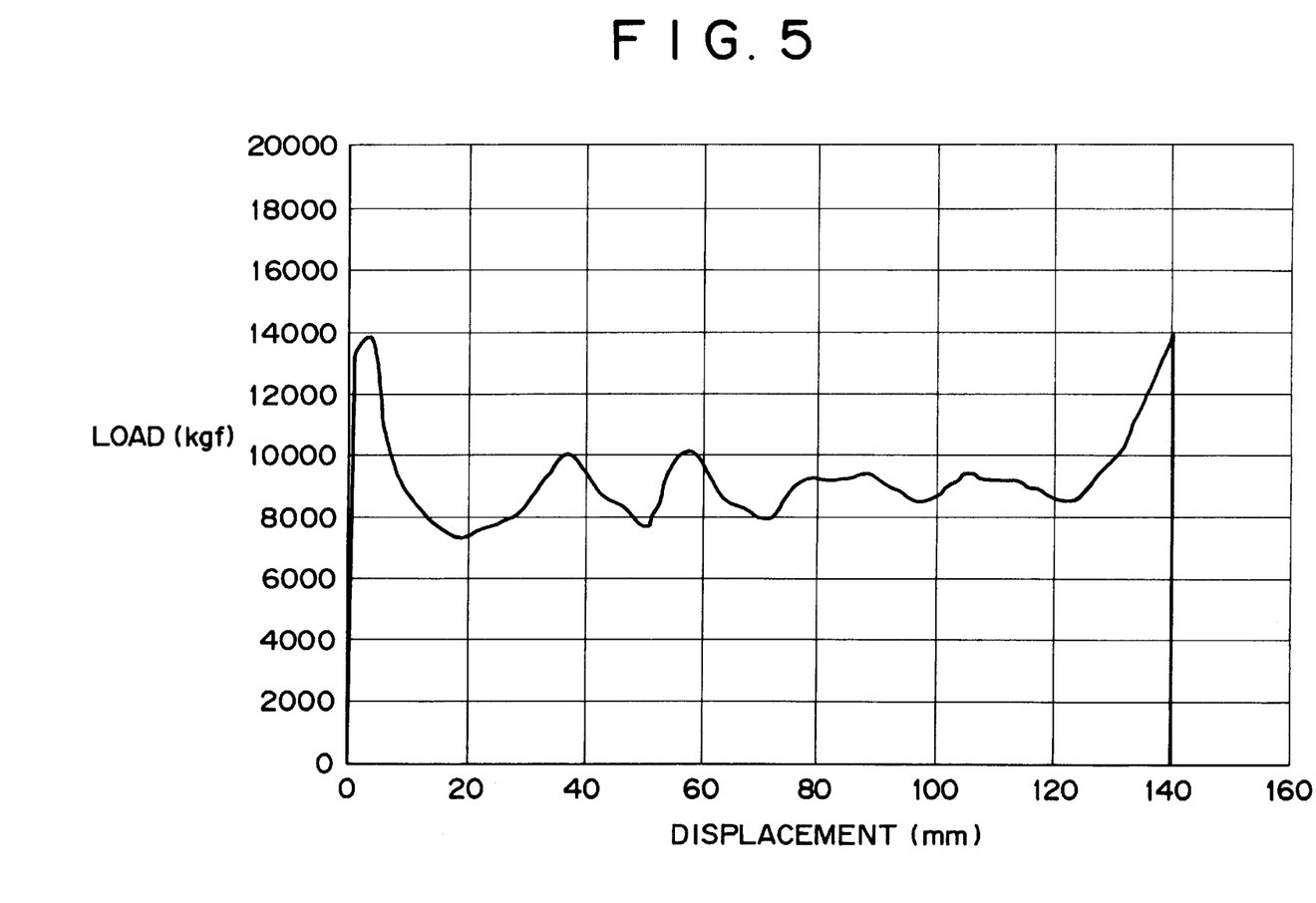
FIG. 5 shows a load-displacement curve of Example C.

The load-displacement curves for the extrusions A, B and C are shown in FIGS. 3, 4 and 5, respectively. Table 1 demonstrates maximum loads, energy absorptions, effective displacements obtained from FIGS. 3, 4 and 5, and respective buckle forms. The effective displacement for Examples in Table 1 represents a displacement at the time when the load again rose to reach the same load as the initial maximum load after the extrusion was crushed completely into a form of bellows. The energy absorption in Table 1 represents an energy absorbed till the effective displacement was realized. On the contrary, in Comparative Examples Euler's buckle was caused so that the load would decrease monotonously, and consequently the effective displacement having the same meaning as in Examples was not able to be measured. Thus, the test was stopped at an appropriate displacement, and this displacement is described for reference in the column for the effective displacement in Table 1. The absorbed energy till the appropriate displacement was realized is described for reference in the column for the energy absorption in Table 1.

TABLE 1

| | Extrusion | Material | Maximum load (ton) | Energy absorption (ton · mm) | Significant displacement (mm) | Buckle form |
|---|---|---|---|---|---|---|
| Comparative Example | A | 6063-T5 | 17.5 | 710* | 60* | Euler's Buckle |
| Example | B | 6063-T5 | 14.6 | 1240 | 136 | Bellows-like |
| Example | C | 6063-T5 | 14.0 | 1250 | 140 | bellows-like |

*Reference value

In the extrusion A, the radius of the corner (Ra) where the outer portion and the rib were connected to each other had a radius of 6 mm, and the radius of the corner (Rb) where the ribs crossed each other had a radius of 6 mm. Thus, they did not satisfy the definition according to the present invention. Since the extrusion A had a large sectional area, its maximum load was large. However, Euler's buckle was caused so that the effective displacement (a reference value) and energy absorption (a reference value) were small. On the contrary, in the extrusion B, the radius of the corner (Ra) where the outer portion and the rib were connected to each other had a radius of 1 mm, and the radius of the corner (Rb) where the ribs were connected to each other had a radius of 1 mm. Thus, they satisfied the definition according to the present invention. The extrusion B was compression-deformed into a form of bellows, so that the effective displacement and the energy absorption were large. In the extrusion C, the radius of the corner (Ra) where the outer portion and the rib were connected to each other had a radius of 1 mm, which did not satisfy the definition (Ra>b/2) according to the present invention and the radius of the corner (Rb) where the ribs were connected to each other had a radius of 1 mm, which satisfied the definition according to the present invention. Thus, the extrusion C was compression-deformed into a form bellows so that the effective displacement and the energy absorption were large. The reason why the maximum load of the extrusion C was smaller than that of the extrusion B would be that the sectional area of the extrusion C was smaller.

When the radius of the corner (Ra) of the hollow extrusion where the outer portion and the rib are connected to each other has a radius ½ or less times as small as the thickness b of the rib (Ra≦b/2), the rigidity of this connected corner is made small so that the plate constituting the outer portion or the rib will be easily buckled, thereby inducing deformation into a form of bellows easily. There may be caused a case that the thickness of the rib is changed in the direction of the plate width thereof; however, in this case, the thickness b of this rib is defined as the maximum thickness of any portion other than the aforementioned connected portion and the cross portion. When the radius of the corner (Rb) where the ribs cross each other has a radius of less than 1 mm (Rb≦1), the rigidity of this cross corner is weak so that the plate constituting the rib is easily buckled, thereby inducing the deformation into a form of bellows. As regards the respective thickness of the outer portion and the rib of the hollow extrusion satisfying either one of these two requirements, it is preferred that the thickness b of the rib is equal to or smaller than thickness a of the outer portion (b≦<a).

When the plate thickness a of the outer portion of the hollow extrusion is smaller than thickness b of the rib (b<a), rigid of the extrusion becomes small so that the rib is easily led, thereby inducing deformation into a form of bellows easily. When the thickness b of the rib is made smaller, the bellows-like deformation is induced more stably.

When the hollow extrusion comprising an aluminum alloy satisfies one or more of the aforementioned requirements, a part of the plates constituting the outer portion or the ribs is buckled and buckles in other plates are induced accordingly, so that deformation into a form of bellows is easily caused, with Euler's buckle being restrained.

The following will describe the second example according to the invention.

Figure 6:
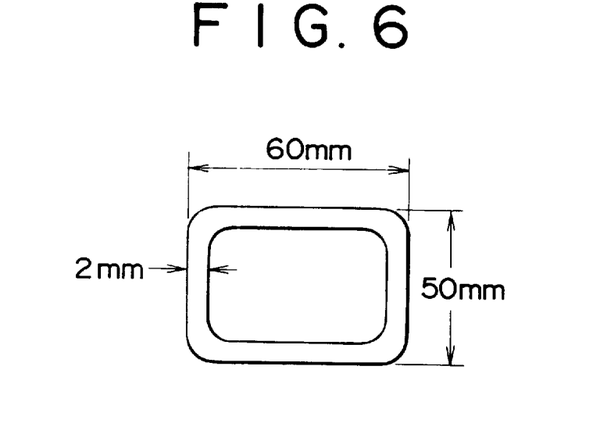
FIG. 6 illustrates a sectional shape of an extrusion used in Examples.

Three sorts of Al—Mg—Si alloy s having the composition shown in Table 2 were formed in ingots by semi-continues casting process, and then the ingots were subjected to heat treatment for homogenizing their textures at 550° C. for 4hours. After that, the ingots were extruded at 500° C. to have a cross section of a mouth-like shape shown in FIG. 6.

TABLE 2

Chemical Elements

| Alloy | Si | Fe | Cu | Mn | Mg | Ti | Zr | Remarks |
|---|---|---|---|---|---|---|---|---|
| 1 | 0.91 | 0.23 | 0.47 | 0.32 | 0.57 | 0.02 | 0.12 | The present invention |
| 2 | 0.52 | 0.18 | 0.07 | 0.07 | 0.70 | 0.02 | 0.04 | Corresponding to JIS 6N01 |
| 3 | 0.40 | 0.18 | 0.01 | 0.01 | 0.55 | 0.01 | 0.00 | Corresponding to JIS 6063 |

The resultant samples were subjected to aging treatment at different temperature conditions shown in Table 3.

TABLE 3

Conditions of heat treatment of samples

| No. | Aging treatment condition |
|---|---|
| A | Leaving the press-quenched sample as it is. |
| B | 170° C. × 3 hr |
| C | 190° C. × 3 hr |
| D | 210° C. × 3 hr |
| E | 230° C. × 3 hr |

Test pieces for the tension test according to JIS 13 B were obtained from the resultant samples to investigate their mechanical properties. The results are shown in Table 4.

TABLE 4

Material strength and Resistance to squeezing cracks

| Samples | | Mechanical strength | | | Resistance to squeezing cracks |
|---|---|---|---|---|---|
| Alloy | Aging treatment | Tensile Strength (N/mm²) | Proof stress (N/mm²) | Elongation (%) | |
| 1 | A | 309 | 183 | 24.8 | ⊚ |
|   | B | 375 | 295 | 19.7 | ○ |
|   | C | 380 | 338 | 13.7 | ○ |
|   | D | 328 | 291 | 13.5 | ⊚ |
|   | E | 287 | 233 | 13.7 | ⊚ |
| 2 | A | 223 | 109 | 25.3 | ○ |
|   | B | 283 | 211 | 18.9 | x |
|   | C | 292 | 265 | 11.6 | x |
|   | D | 278 | 238 | 11.2 | Δ |
|   | E | 239 | 195 | 11.9 | Δ |
| 3 | A | 181 | 85 | 26.4 | ○ |
|   | B | 282 | 163 | 19.1 | x |
|   | C | 273 | 225 | 12.8 | x |
|   | D | 240 | 191 | 11.8 | Δ |
|   | E | 193 | 146 | 12.5 | Δ |

Furthermore, using the same samples, static compressive load was applied to the samples in their axial direction at a displacement speed of from several to several tens mm/minutes in an Amsler testing machine shown in FIG. 7 to carry out a static crush test. The samples had a length of 200 mm, and compressed by a distance of 100 mm in their axial direction. If the sectional areas of the samples are the same, the maximum load when the samples are crushed is in proportion to the strength of the sample-materials. Energy absorption is also in proportion to the strength of the sample-materials, and becomes lower as the number and the degrees of cracks are larger. Thus, strong materials wherein any squeezing crack does not break out are desired. Resistance to squeezing cracks was evaluated as the following four steps:

⊚: No crack, ○: A few small cracks break out, Δ: A number of small cracks break out, x: Ruptures break out. Results from this test are also shown in Table 4.

Table 4

Table 4 demonstrates that under the aging condition C exhibiting the maximum strength the alloy 1 meeting the requirement in composition according to the present invention had a larger material-strength and more excellent resistance to squeezing cracks than the alloys 2 and 3. This tendency was the same under the other aging condition.

On the contrary, under the aging conditions D and E (corresponding to overaging treatment), the material strength was worse than that under the aging condition C, but resistance to squeezing cracks was remarkably good.

Under the aging condition A of press quenching, the resistance to squeezing cracks shown in FIG. 4 did not appear worse than that under the averaging conditions D and E. According to the condition A, however, as spontaneous aging advanced, or aging advanced under the state that the manufactured product, when used, was kept within precipitation temperature or higher, the resistance to squeezing cracks might become worse. Thus, the extrusion according to the aging condition A was not able to be regarded as a reliable material for an energy absorbing member. On the contrary, according to the overaging conditions D and E spontaneous aging did not advance. Even if the manufactured product, when used, was kept within precipitation temperature or higher, the resistance to squeezing cracks did not become bad. Thus, the extrusions according to the conditions C and E were highly reliable.

When the aging conditions D and E were applied to the alloys 2 and 3, which did not satisfy the composition according to the present invention, the resistance to squeezing cracks was improved as compared with the alloys according to the conditions B and C, but the resistance to squeezing cracks as high as that of the alloy 1 was not obtained because of inappropriate compositions.

When a heat treated aluminum alloy extrusion is subjected to averaging treatment, the maximum load thereof against compression in its axial direction is somewhat reduced but the extrusion is stably contracted and deformed into a form of bellows without generation of squeezing cracks. Thus, overall resistance to squeezing cracks in the axial direction is improved. It is preferred that the alloy extrusion is subjected to averaging treatment, so as to have a proof stress from 0.5 to 0.9 times σ max, which is a mere criterion. If the proof stress after the overaging treatment is more than 0.9 times σ max, squeezing crack are insufficiently prevented. On the contrary, if the proof stress is less than 0.5 times σ max, the strength and energy absorption become too low. In particular, the proof stress is more preferable from 0.6 to 0.8 times σ max.

The σ max referred to in the invention is a maximum value of proof stress obtained by aging-treating an extrusion subjected to solution quenching or press quenching. About extrusions subjected to solution quenching or press quenching under the same condition, the σ max can be specified.

The treating condition for it cannot be specified as a single condition since the treating period is changed dependently on the treating temperature. For example, the treating condition is as follows: the treating temperature is from 177 to 183° C. and the treating period is from 330 to 400 minutes, or the treating temperature is from 187 to 193° C. and the treating period is from 150 to 210 minutes.

The proof stress after overaging treatment is compared with the σ max. The overaging treatment means aging treatment conducted at a higher temperature or for a longer period than the aging treatment for obtaining the σ max. Specifically, if aging treatment at T1° C. is conducted so that the maximum strength at T1° C. can be obtained by the treatment for H1 minutes, overaging treatment is conducted at T1° C. for (H1+α) minutes. If aging treatment for H2 minutes is conducted so that the maximum strength by this treatment for H2 minutes can be obtained at T2° C., overaging treatment is conducted at (T2+β) ° C. for H2 minutes. The values α and β are positive values.

Al—Mg—Si alloy having an excellent resistance to squeezing cracks in the axial direction is a precipitation hardening alloy comprising, as main components, Mg and Si, and the alloy generally has the following compositions:

Mg: 0.35–1,1% by weight,
Si: 0.5–1.3% by weight,
Cu: 0.15–0.7% by weight,
Ti: 0.005–0.2% by weight,
Zr: 0.06–0.02% by weight.
One or more of Mn: 0.05–0.5% by weight and Cr: 0.05–0.15% by weight, and
the balance Al, and inevitable impurities It is preferred to further comprise 0.3% or less by weight of Fe.

The amount of each of the impurities is 0.05% or less by weight, and the total amount of the impurities is 0.15% or less by weight. The reasons for limiting the amounts of respective components are as follows. Mg and Si Mg and Si are elements for providing strength to the alloy. If the Mg content is less than 0.35% by weight or the Si content is less than 0.5% by weight, effects by aging treatment cannot be obtained. Because of overaging treatment in the present invention, strength becomes lower as compared with that obtained by conventional aging treatment. Thus, the Mg or Si content less than that defined as above makes it impossible to obtain sufficient strength and energy absorption as an energy absorbing member. On the contrary, if the Mg content is more than 1.1% by weight or the Si content is more than 1.3% by weight, overaging treatment is excessively required for preventing generation of squeezing cracks, and consequently the strength and energy absorption of the material itself are considerably reduced. Thus, the Mg content and Si content are set within the ranges from 0.35 to 1.1% by weight and from 0.5 to 1.3% by weight, respectively. Cu Cu causes increased matrix strength of the alloy and improved ductility of the material. Because strength of the alloy according to the present invention is reduced by overaging treatment, it is necessary to raise the matrix strength of the alloy beforehand. However, if the Cu content is less than 0.15% by weight, the aforementioned effect cannot be obtained. On the contrary, if the Cu content is more than 0.7% by weight, this effect is saturated and the capability of press quenching and welding is deteriorated. Thus, the Cu content is set within the range from 0.15 to 0.7% by weight. Ti Ti has a function of generating nuclei in melting casting and making cast texture fine, and is added in an amount of 0.005% by weight or more. However, if the amount is too much, coarse compounds are produced to weaken the Al—Mg—Si based alloy. Thus, the upper range of the Ti content is 0.2% by weight. Zr Zr is precipitated as an intermetallic compound in the ingot in homogenizing treatment, and restrains secondary recrystalization in hot process or the like to make the metal texture fine. Zr causes the texture to be fibrous in press process, and remarkably improves resistance to squeezing cracks, as compared with isotropic recrystallized texture. In order to obtain this effect, it is necessary that the Zr content is 0.06% by weight or more. However, excess addition thereof permits a coarse intermetallic compound to be produced in casting, so as to result in drops in strength and ductility, and deterioration of resistance to squeezing cracks. Thus, the Zr content needs to be set to 0.2% or less by weight. Mn and Cr Mn and Cr basically have the same effects as Zr. The effect of the individual element is worse than that of Zr. However, if at least one of Mn and Cr is added together with Zr, it is possible to obtain more advantageous effect than effect obtained by addition of only Zr. Thus, in the invention it is essential to contain at least one of Mn and Cr. To obtain this effect, it is necessary that the Mn content and the Cr content are set to 0.05% by weight or more, respectively. However, excess addition thereof permits a coarse intermetallic compound to be produced in casting, so as to result in drops in strength and ductility, and deterioration of resistance to squeezing cracks. Thus, the Mn content needs to be set to 0.5% or less by weight. The Cr content needs to be set to 0.15% or less by weight, in the light of a problem about the surface property of the alloy.

In order to produce an energy absorbing member using the aforementioned Al—Mg—Si alloy, in a conventional manner the starting material is subjected to melting casting to obtain an ingot, and then the ingot is subjected to homogenizing treatment. Subsequently, the resultant is hot-pressed so as to have a desired sectional shape, and then press quenched. Alternatively, the resultant is hot-pressed so as to have a desired sectional shape and then is subjected to solution quenching treatment followed by averaging treatment. As described before, the overaging treatment is conducted at 210 to 230° C. for 150 to 240 minutes. By the averaging treatment under this condition, the precipitation $Mg_2Si$ is distributed in a dense and fine form in the alloy, and then it continues to grow so as to become coarse. Thus, strength of the alloy is lowered to less than the maximum strength.

What is claimed is:

1. An energy absorbing member comprising a hollow extrusion which is made of an aluminum alloy and has an outer portion and an inner rib connected to the outer portion,
   the radius of the corner where the rib and the outer portion are connected to each other being not more than a half of the thickness of the rib.

2. An energy absorbing member comprising a hollow extrusion which is made of an aluminum alloy and has an outer portion and inner ribs which are connected to the outer portion and cross each other,
   the radius of the corner where the ribs cross each other being 1 mm or less.

3. The energy absorbing member according to claim 2, wherein the radius of the corner where the outer portion is connected to the ribs is not more than a half of the thickness of the ribs.

4. The energy absorbing member according to claim 3, wherein the aluminum alloy is a heat treated aluminum alloy subjected to overaging treatment.

5. The energy absorbing member according to claim 4, wherein a proof stress of the heat treated aluminum alloy subjected to overaging treatment is 0.5–0.9 times the maximum value of a proof stress ($\sigma$ 0.2) obtained by aging treatment.

6. The energy absorbing member according to claim 5, wherein the heat treated aluminum alloy subjected to overaging treatment is an Al—Mg—Si alloy.

7. The energy absorbing member according to claim 6, wherein the Al—Mg—Si alloy comprises 0.35 to 1.6% by weight of Mg, and 0.2 to 1.6% by weight of Si.

8. The energy absorbing member according to claim 6, wherein the Al—Mg—Si alloy comprises 0.35 to 1.1% by weight of Mg, 0.5 to 1.3% by weight of Si, 0.15 to 0.7% by weight of Cu, 0.005 to 0.2% by weight of Ti, and 0.06 to 0.2% by weight of Zr; at least one element selected from the group consisting of 0.05 to 0.5% by weight of Mn and 0.05 to 0.15% by weight of Cr; and the balance being Al and inevitable impurities.

9. The energy absorbing member according to claim 8, wherein the Al—Mg—Si alloy further comprises 0.3% or less by weight of Fe.

10. The energy absorbing member according to claim 1, wherein the aluminum alloy is a heat treated aluminum alloy subjected to averaging treatment.

11. The energy absorbing member according to claim 10, wherein a proof stress of the heat treated aluminum alloy subjected to averaging treatment is 0.5–0.9 times the maximum value of a proof stress ($\sigma$ 0.2) obtained by aging treatment.

12. The energy absorbing member according to claim 11, wherein the heat treated aluminum alloy subjected to overaging treatment is an Al—Mg—Si alloy.

13. The energy absorbing member according to claim 12, wherein the Al—Mg—Si alloy comprises 0.35 to 1.6% by weight of Mg, and 0.2 to 1.6% by weight of Si.

14. The energy absorbing member according to claim 12, wherein the Al—Mg—Si alloy comprises 0.35 to 1.1% by weight of Mg, 0.5 to 1.3% by weight of Si, 0.15 to 0.7% by weight of Cu, 0.005 to 0.2% by weight of Ti, and 0.06 to 0.2% by weight of Zr; at least one element selected from the group consisting of 0.05 to 0.5% by weight of Mn and 0.05 to 0.15% by weight of Cr; and the balance being Al and inevitable impurities.

15. The energy absorbing member according to claim 14, wherein the Al—Mg—Si alloy further comprises 0.3% or less by weight of Fe.

16. An energy absorbing member comprising an extrusion of an aluminum alloy, the aluminum alloy being an overaged heat treated aluminum alloy and comprising 0.35 to 1.1% by weight of Mg,
0.5 to 1.3% by weight of Si,
0.15 to 0.7% by weight of Cu,
0.005 to 0.2% by weight of Ti,
0.06 to 0.2% by weight of Zr,
at least one element selected from the group consisting of
0.05 to 0.5% by weight of Mn and
0.05 to 0.15% by weight of Cr, and
inevitable impurities, wherein a proof stress of the overaged heat treated aluminum alloy is 0.5–0.9 times the maximum value, $\sigma$ max, of a proof stress ($\sigma$ 0.2) obtained by aging treatment.

17. The energy absorbing member according to claim 16, wherein the aluminum alloy further comprises 0.3% or less by weight of Fe.

18. A method of making an energy absorbing member, the method comprising extruding an aluminum alloy; and forming the energy absorbing member of claim 1.

19. A method of making an energy absorbing member, the method comprising extruding an aluminum alloy; and forming the energy absorbing member of claim 2.

20. A method of making an energy absorbing member, the method comprising extruding an aluminum alloy; and forming the energy absorbing member of claim 16.

* * * * *